(12) United States Patent
Mak et al.

(10) Patent No.: US 7,469,328 B1
(45) Date of Patent: Dec. 23, 2008

(54) SYNCHRONIZATION TECHNIQUE FOR HIGH SPEED MEMORY SUBSYSTEM

(75) Inventors: Kwok Ken Mak, Chapel Hill, NC (US); Xiaoming Sun, Chapel Hill, NC (US)

(73) Assignee: Cisco Technology, Inc., San Jose, CA (US)

( * ) Notice: Subject to any disclaimer, the term of this patent is extended or adjusted under 35 U.S.C. 154(b) by 592 days.

(21) Appl. No.: 10/359,985

(22) Filed: Feb. 6, 2003

(51) Int. Cl.
*G06F 13/28* (2006.01)
*G06F 12/12* (2006.01)

(52) U.S. Cl. ........................................ 711/167; 711/159
(58) Field of Classification Search ........................ None
See application file for complete search history.

(56) References Cited

U.S. PATENT DOCUMENTS

| | | | |
|---|---|---|---|
| 5,636,164 A | 6/1997 | Van As et al. | |
| 6,026,464 A | 2/2000 | Cohen | |
| 6,065,092 A * | 5/2000 | Roy ............................... | 711/5 |
| 6,078,532 A | 6/2000 | Rivers et al. | |
| 6,147,996 A | 11/2000 | Laor et al. | |
| 6,201,729 B1 | 3/2001 | Rivers | |
| 6,239,626 B1 | 5/2001 | Chesavage | |
| 6,330,645 B1 | 12/2001 | Harriman | |
| 6,636,955 B1 * | 10/2003 | Kessler et al. ................ | 711/167 |
| 6,654,824 B1 * | 11/2003 | Vila et al. ...................... | 710/60 |
| 6,674,378 B2 * | 1/2004 | Johnson et al. ............. | 341/120 |
| 6,690,757 B1 * | 2/2004 | Bunton et al. ................ | 375/371 |
| 7,010,612 B1 * | 3/2006 | Si et al. ......................... | 709/232 |
| 7,133,416 B1 * | 11/2006 | Chamdani et al. ........... | 370/466 |
| 2004/0015666 A1 * | 1/2004 | Rojas et al. .................. | 711/159 |
| 2005/0024926 A1 * | 2/2005 | Mitchell et al. ............. | 365/154 |

OTHER PUBLICATIONS

Synchronous's dram 256Mb specificiation, MT48LC64M4A2, Micron, 1999, pp. 1-76.*

* cited by examiner

*Primary Examiner*—Hyung Sough
*Assistant Examiner*—Duc T. Doan
(74) *Attorney, Agent, or Firm*—Cesari and McKenna LLP

(57) ABSTRACT

A technique synchronizes data retrieved from memory devices at a memory controller of a high-speed memory subsystem. Each memory device is organized into a plurality of data groupings. The memory controller stores (via one or more write operations) a known synchronization (sync) pattern at each data grouping on the memory devices and then retrieves (via one or more read operations) that sync pattern from the groupings. Synchronization logic located at a local clock boundary of the memory controller is configured to recognize the retrieved sync pattern and "automatically" synchronize all pieces of data retrieved from the data groupings, even though there may be substantial skew between the groupings.

29 Claims, 7 Drawing Sheets

SYNCHRONIZATION TECHNIQUE FOR HIGH SPEED MEMORY SUBSYSTEM

FIELD OF THE INVENTION

The invention relates generally to memory subsystems and, more specifically, to synchronizing data retrieved from high speed memory devices of a memory subsystem within a networking device, such as an intermediate network node.

BACKGROUND OF THE INVENTION

A computer network is a geographically distributed collection of interconnected communication links for transporting data between nodes, such as computers. Many types of computer networks are available, with the types ranging from local area networks (LANs) to wide area networks (WANs). A plurality of LANs may be further interconnected by an intermediate network node, such as a router or switch, to form an inter-network of nodes that extends the effective "size" of the computer network by increasing the number of communicating nodes. The nodes typically communicate by exchanging discrete frames or packets of data according to predefined protocols. In this context, a protocol consists of a set of rules defining how the nodes interact with each other.

Each node typically comprises a number of basic subsystems including processor, memory and input/output (I/O) subsystems. Data is transferred between the memory, processor and I/O subsystems over a system bus, while data requests within the memory subsystem occur over a memory bus coupling a memory controller to one or more memory devices. Each bus typically consists of address, data and control lines, with the control lines carrying control signals specifying the direction and type of transfer. For example, the processor may issue a read request to the memory controller, requesting the transfer of data from an addressed location on a memory device coupled to the memory bus. The processor may then process the retrieved data in accordance with instructions and thereafter may issue a write request to the controller to store the processed data in, e.g., another addressed location in the memory subsystem.

One of the control signals transmitted between the memory controller and memory devices is a clock signal used to control the timing of data transfer operations. The clock signal synchronizes the transmission and reception of data between physically separated points on the memory bus. The memory controller generates both local clock signals that are used to control logic on the controller within a local clock domain and remote clock signals used to control the memory devices within a remote clock domain when transmitting data to and from the memory controller. The local and remote clock signals are generated from the same clock source, e.g., a phase lock loop circuit on the memory controller, to thereby produce local and remote clock frequencies that are substantially identical.

For proper operation of the memory subsystem, clock signals should arrive at bus interface circuitry at the same time; otherwise, reliable data transmission is not ensured. For example, if a bus interface circuit receiving data is "clocked" later than others, the earlier-clocked bus interface circuits may overwhelm the data before it is stored at its proper destination. This lack of simultaneity in reception of the clock signals, i.e., clock skew, directly increases the amount of time that the data must remain stable on the memory bus to ensure reliable data transmission; this, in turn, increases the time required for each data transfer on the bus and, thus reduces the speed and performance of the memory subsystem.

The performance of the memory subsystem may be increased by increasing the number of high-speed memory devices in the subsystem, along with increasing the speed and width of the memory bus coupled to those devices. In this context, high speed denotes the transfer of a "piece" of data every nanosecond (nsec) or, generally, at gigahertz (GHz) data rates. FIG. 1 is a schematic block diagram of a typical high performance memory subsystem 100 comprising a memory controller 110 coupled to a plurality of high speed memory devices 130 over a memory bus 120. The interaction of the memory controller and memory devices is depicted in a linear fashion, illustrating the transfer of a request (e.g., a read or write request) from the controller to the memory devices and then, in the case of a read request, the return of requested data from the memory devices to the memory controller.

Assume the memory subsystem 100 includes, e.g., eight commodity memory devices 130, wherein each memory device is 32 data bits wide. Therefore, the eight memory devices of the memory subsystem collectively form a 256-bit data portion 126 of the memory bus 120. Moreover, the 32 data bits of each memory device are organized into four data groupings 125, wherein each data grouping is eight bits wide and has its own reference clock signal. For a typical commodity memory device, there can be as much as ±1100 picoseconds of skew between data groupings on the same device.

When issuing a request, the memory controller 110 transmits a source clock (clk) signal 122 along with address information 124 (and write data, if necessary) over extended board traces 152 on a printed circuit board (PCB 150) to the high-speed memory devices 130. The memory devices typically return a reference "echo" clock-signal 128 along with any requested read data over the data bus portion 126 to the memory controller 110. The reference echo clock signal 128 is a data output strobe (DQS) single bit or, more typically for high-speed memory devices, differential signal. The DQS clock signal 128 and the data bus (DQ) bits 126 are also transmitted over extended board traces 152 of the PCB.

When laying out the PCB 150, both the reference clock and data bus board traces 152 are routed to very precise lengths. However, there is still some degree of error in the routing because the signals carried over these traces may be routed through different layers of the PCB having different impedance characteristics that translate into timing differences. In general, process, voltage and temperature (PVT) differences, along with different dielectric constants among the various layers of the PCB 150, introduce substantial delays or skew into the memory subsystem 100. Moreover, the memory devices 130 in the memory subsystem may have different timing characteristics that introduce skew into the subsystem.

In general, there are many areas of the memory subsystem where substantial delay or skew is introduced into the system 100. For example, at the output of the memory controller there may be delay between the source clock and data/address bus signals, hereinafter referred to as $\Delta t_1$. The memory controller 110 may be embodied as an application specific integrated circuit (ASIC) and a wide 256-bit data bus interface circuit 112 on the controller ASIC can have as much as 0.5 nsecs of skew. Here, the 256 bits of data are spread over a large area of the die and the reluctance on behalf of certain ASIC vendors to manually place and tune individual bits during placement may result in such skew.

In addition, board trace delays between the memory controller 110 and memory devices 130 may introduce skew, hereinafter denoted as $\Delta t_2$. For example, the source clock signals 122 issued by the memory controller to the individual memory devices can have approximately 0.5 nsecs of skew.

There are also delays/skew, denoted $\Delta t_3$, between the various memory devices 130. In the case of reduce latency dynamic random access memory (RLDRAM) devices, there is a minimum-maximum delay of 1.5 nsecs to 2.3 nsecs for the DQS clock signal 128. The DQS reference clocks for each data grouping originating from the same memory device can have approximately 0.5 nsecs of skew. Each memory device further has its own unique microenvironment that can have different PVT characteristics, which can produce approximately 1 nsec of skew.

Skew also arises with respect to the board trace/layout and routing (along with crosstalk) for signals transmitted between the memory devices and the memory controller, hereinafter denoted $\Delta t_4$. In this case, the delays associated with $\Delta t_4$ can amount to another 0.5 nsecs of skew. As noted, logic in the memory controller 110 has finite delay and routing between the logic may not be identical, therefore translating into further skew, herein denoted $\Delta t_5$. Here, the $\Delta t_5$ skew arises between bus interface logic 112 on the memory controller used to capture data from the memory devices in the remote clock domain 170 and internal logic 114 on the controller 110 used to bring that data into the local clock domain 160 across a local clock boundary 165.

When operating the memory subsystem and the memory devices at high speed, every nsec can translate into a (clock) cycle of frequency. For example, operating the memory subsystem at 400 megahertz (MHz) frequency results in approximately a 2.5 nsec clock cycle rate. Yet, the data clock rate is half the clock cycle rate or 1.25 nsecs because of the use of double data rate (DDR) data capture. The skew in the memory subsystem may cause phase differences between the clock signals (on the order of a couple of nsecs) that results in the signals being entirely asynchronous. Operation of the memory subsystem at such high data rates may, in turn, result in portions of the read data being spread over multiple clock boundaries. That is, data returned to the memory controller 110 from the memory devices 130 in response to a read request may not arrive at the controller at the same time. When the memory controller attempts to capture the returned read data, all of that data may not be present at the same clock cycle boundary.

For instance, the above-described skew budget represented by the addition of $\Delta t_1$-$\Delta t_5$ can result in approximately three nsecs of arrival time uncertainty (phase differences) for data transmitted between the memory controller 110 and the memory devices 130 and, more specifically, the data groupings 125 of the memory devices. Three nsecs of skew represent almost three cycles of the 1.25 data clock rate, resulting in phase misalignment at the memory controller 110. Capturing the data within an individual grouping at a clock boundary can be difficult, but manageable. Yet, such phase misalignment may cause portions of a 256-bit data "word" returned by the memory devices in response to a read request to arrive at the controller spread out over three different clock cycles, thus making it impossible to capture the entire data across the 256-bit bus portion 126 at the same clock boundary. Phase alignment is crucial to capturing data at the memory controller and the present invention is directed, in part, to ensuring such alignment at the memory controller.

SUMMARY OF THE INVENTION

The present invention overcomes the disadvantages of the prior art by providing a technique for synchronizing data retrieved from memory devices at a memory controller of a high-speed memory subsystem. Each memory device is organized into a plurality of data groupings. Broadly stated, the memory controller stores (via one or more write operations) a known synchronization (sync) pattern at each data grouping on the memory devices and then retrieves (via one or more read operations) that sync pattern from the groupings. Synchronization logic located at a local clock boundary of the memory contoller is configured to recognize the retrieved sync pattern and "automatically" synchronize all pieces of data retrieved from the data groupings, even though there may be substantial skew between the groupings.

According to the technique, a synchronization logic circuit is associated with (provided for) each data grouping on each memory device of the memory subsystem. Each synchronization logic circuit comprises a "slip" first in first out (FIFO) queue, a comparator configured to recognize the sync pattern, a write pointer of the FIFO running in a remote clock domain of the subsystem and a read pointer of the FIFO operating in a local clock domain. The synchronization logic is located at a local clock boundary within the memory controller and the slip FIFO "traverses" that local clock boundary. In this context, the write pointer of the slip FIFO is controlled by remote clock signals operating in the remote clock domain, while the read pointer of the FIFO is controlled by local clock signals operating in the local clock domain.

The sync pattern retrieved from the memory devices is loaded into the slip FIFO and provided to the comparator, which compares the received pattern with a locally stored image of the sync pattern. The comparator holds the write pointer at location zero until it recognizes the sync pattern. When the received sync pattern matches the locally stored sync pattern, the comparator releases the write pointer so that it may begin incrementing in a "free running" manner. Although the write pointer is free running, the read pointer is still held at location zero until all slip FIFOs have received the sync pattern. When the sync pattern has been fully received at each slip FIFO, thereby allowing the write pointer of the FIFO to run freely, the write pointer generates an active flag. A master read pointer controller cooperates with the synchronization logic to receive all active flags of all write pointers associated with all slip FIFOs.

According to an aspect of the inventive technique, the read pointers of all slip FI-FOs are not released until all write pointers assert their active flags. That is once all of the active flags are asserted, the master read pointer controller releases all of the read pointers at the same time using, e.g., a single release signal that is broadcast from the controller to all read pointers. This allows all of the read pointers to become free running. Accordingly, the entire sync pattern word received from all memory devices is synchronized in the local clock domain on the same local clock cycle, thereby effectively synchronizing operation of those memory devices in the subsystem. Normal operation of the memory subsystem can then begin.

Advantageously, the novel technique is capable of synchronizing data groupings having substantial skew by providing varying amounts of synchronization logic: The synchronization technique does not require additional interface signals to indicate when data is valid at the memory controller. The novel synchronization technique further enables the memory bus to be substantially wide and tolerate skewed data for many data groups that can span multiple clock cycles.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 2:
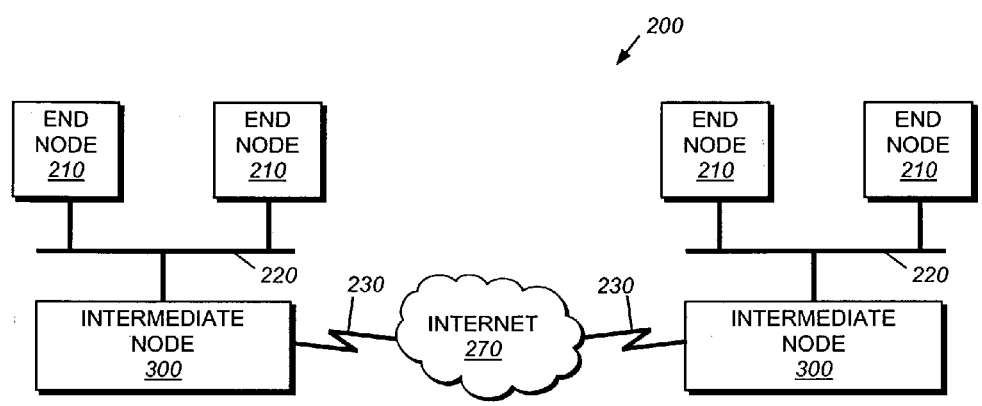
FIG. 2 is a schematic block diagram of a computer network that can be advantageously used with the present invention.

FIG. 2 is a schematic block diagram of a computer network 200 that can be advantageously used with the present invention. The computer network 200 comprises a collection of communication links and segments connected to a plurality of nodes, such as end nodes 210 and intermediate network nodes 300. The network links and segments may comprise local area networks (LANs) 220, wide area networks (WANs) such as Internet 270 and WAN links 230 interconnected by intermediate network nodes 300, such as network switches or routers, to form an internetwork of computer nodes. These inter-networked nodes communicate by exchanging data packets according to a predefined set of protocols, such as the Transmission Control Protocol/Internet Protocol (TCP/IP) and the Internetwork Packet eXchange (IPX) protocol.

Figure 3:
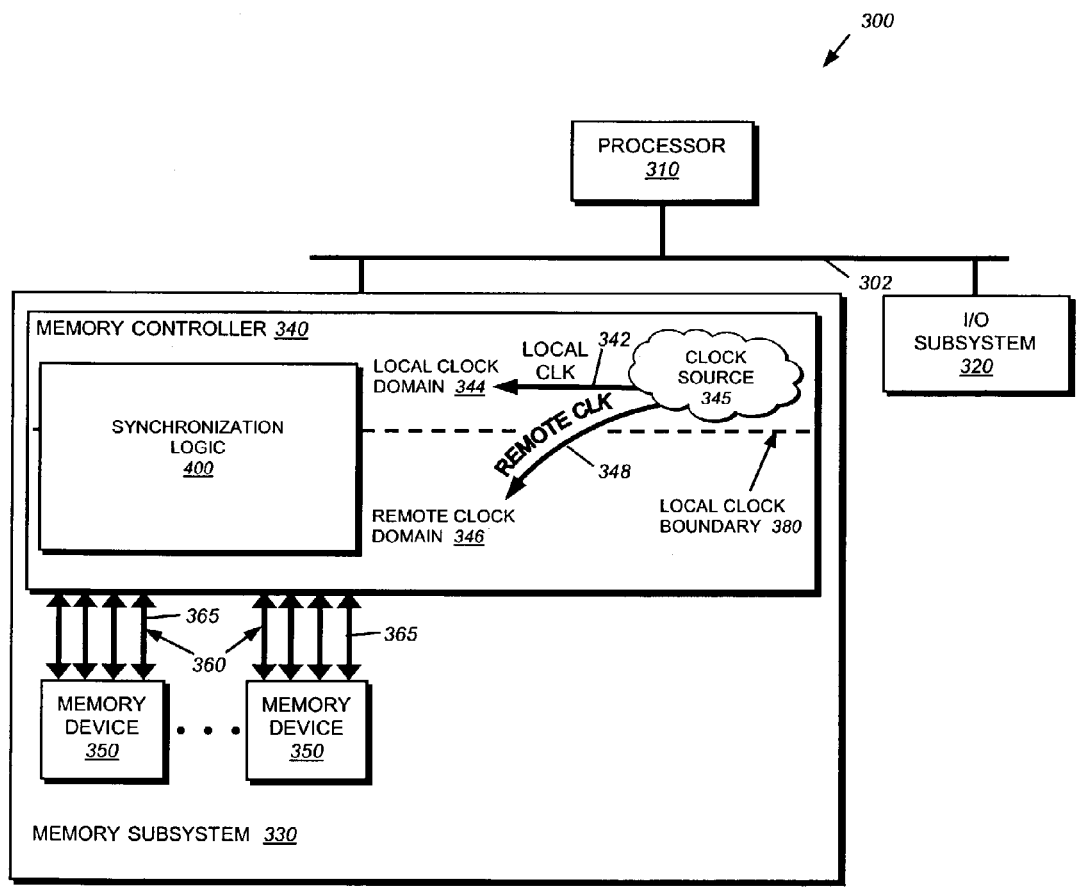
FIG. 3 is a schematic block diagram of an illustrative intermediate network node having a plurality of subsystems, including a high-speed memory subsystem that may be advantageously used with the present invention.

FIG. 3 is a schematic block diagram of an illustrative intermediate network node 300, such as a router or switch, having a plurality of subsystems, including a processor 310 coupled to an input/output (I/O) subsystem 320 and a high-speed memory subsystem 330 via a system bus 302. A memory controller 340 of the memory subsystem 330 is connected to a plurality of high-speed memory devices 350 over a memory bus 360. The memory bus 360 comprises address, data and control lines, with the control lines carrying clock signals transmitted between the memory controller and memory devices, and used to control the timing of data transfer operations. The memory controller generates local clock signals 342 that are used to control logic on the controller within a local clock domain 344 and remote clock signals 348 used to control the memory devices within a remote clock domain 346 when transmitting data to and from the memory controller. The local and remote clock signals are generated from the same clock source 345, e.g., a phase lock loop circuit on the memory controller, to thereby produce local and remote clock frequencies that are substantially identical.

The memory devices 350 comprise storage locations addressable by the processor 310 for storing software programs and data structures associated with the invention described herein. An operating system, portions of which are typically resident in memory and executed by the processor, functionally organizes the intermediate node by, inter alia, invoking network operations in support of software processes executing on the node. It will be apparent to those skilled in the art that other memory means, including various computer readable media, may be used for storing and executing program instructions pertaining to the described mechanism and technique.

In the illustrative embodiment, the high-speed memory devices 350 are commodity memory devices embodied as, e.g., fast cycle dynamic random access memory (FCDRAM), static DRAM (SDRAM), RAMBUS or reduced latency DRAM (RLDRAM) memory devices. The memory subsystem 330 illustratively includes eight commodity memory devices 350, wherein each memory device is 32 data bits wide. The eight memory devices of the memory subsystem collectively form a 256-bit data portion of the memory bus 360. Moreover, the 32 data bits of each memory device are organized into four data groupings 365, wherein each data grouping is eight data bits wide (DQ) and has its own reference clock signal (DQS).

The memory subsystem illustratively operates at 400 megahertz (MHz) or a 2.5 nanoseconds (nsecs) clock cycle rate. However, the memory system is operated at double data rate (DDR) and, as such, the data clock rate is 1.25 nsecs. In DDR, two "pieces" of data are transferred in one clock cycle, i.e., one piece of data is transferred on a rising edge of the clock signal, while the other piece of data is transferred on a falling edge of the clock signal. The memory devices 350 are capable of operating on burst lengths of two, four or eight pieces of data. In the case of a burst length of two, each memory device 350 is configured to send two pieces of data in one clock cycle. In the case of a burst length of four, the memory device is configured to send four pieces of data in two clock cycles. Thus, if the memory device 350 is configured with a burst length of two and four pieces of data are to be transferred, then two requests must be issued by the memory controller 340 to transfer the data. On the other hand, if the memory device is configured for a burst length of four and four pieces of data are to be transferred, then only one request need be issued by the controller 340.

Figure 1:
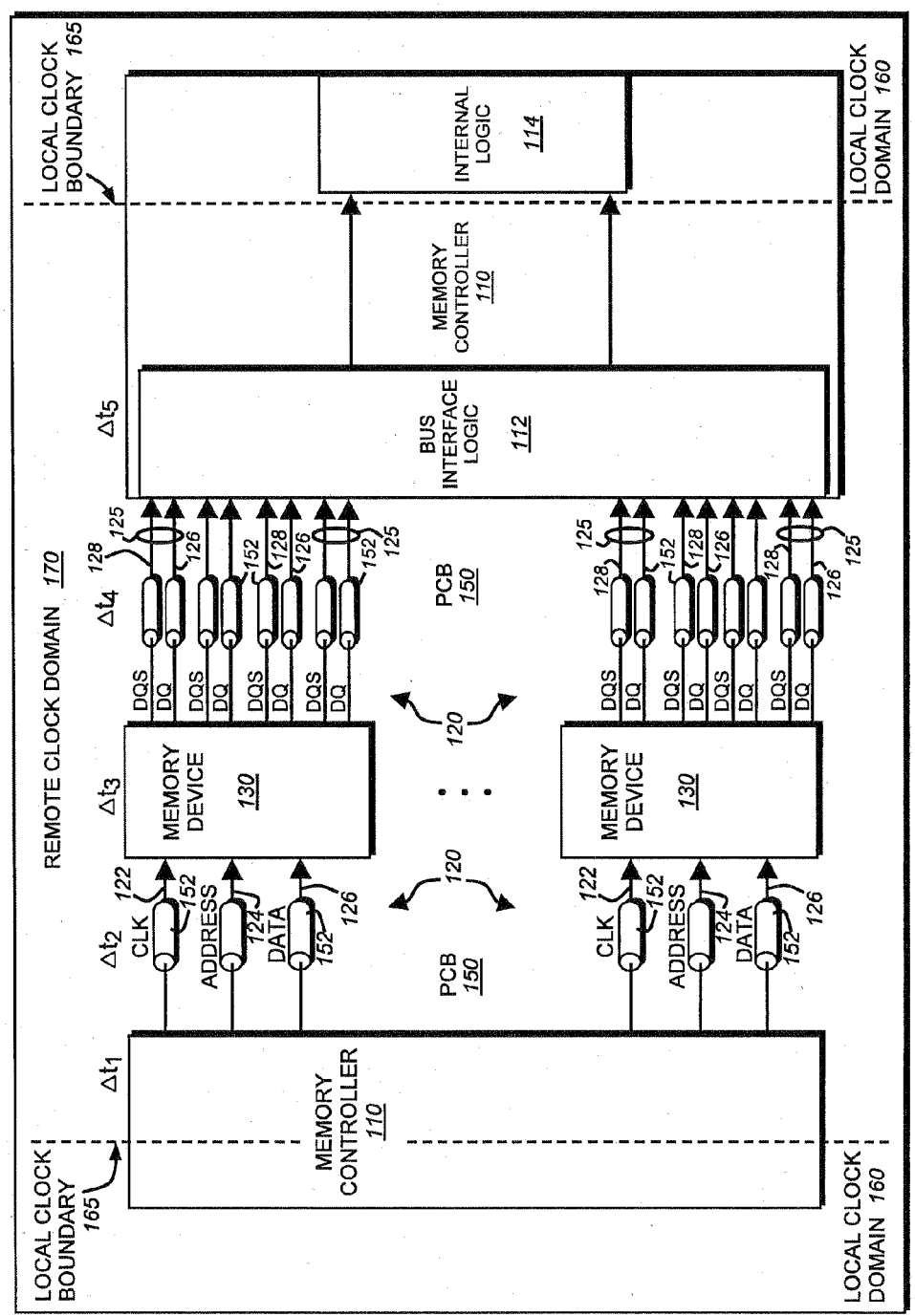
FIG. 1 is a schematic block diagram of a typical high performance memory subsystem.

The memory subsystem 330 has a skew budget similar to the skew budget of memory subsystem 100 represented by the addition of $\Delta t_1$-$\Delta t_5$ (FIG. 1). As noted, such a skew budget can result in approximately three nsecs of arrival time uncertainty (phase differences) for data transmitted between the memory controller 340 and the memory devices 350 and, more specifically, the data groupings 365 of the memory devices. When operating the memory subsystem 330 and the memory devices 350 at high speed, e.g., 400 MHz or a data clock rate of 1.25 nsecs, the three nsecs of skew represents approximately three data clock cycles, resulting in phase misalignment at the memory controller 340. Yet, the memory subsystem may operate at several gigahertz data bit rate and, in that case, the accumulated skew represents much more than three cycles of the 1.25 nsec data clock rate.

As a result, data returned to the memory controller 340 from the memory devices 350 in response to a read request may not arrive at the controller at the same time. When the memory controller attempts to capture the returned read data, all of that data may not be present at the same clock cycle boundary. Phase alignment is crucial to capturing data at the memory controller 340 and the present invention is directed, in part, to ensuring such alignment at the controller 340.

The present invention comprises a technique for synchronizing data retrieved from memory devices at a memory controller of a high-speed memory subsystem. Broadly stated, the memory controller stores (via one or more write operations) a known synchronization (sync) pattern on the memory devices and then retrieves (via one or more read operations) that sync pattern from the devices. Based on the time when the known sync pattern is fully retrieved, the memory controller can determine the amount of skew between each of the memory devices. Synchronization logic at a local clock boundary of the memory controller is configured to recognize the retrieved sync pattern and "automatically" synchronize all pieces of data retrieved from the data groupings, even though there may be substantial (e.g., as much as 3-20 cycles) skew between the groupings.

Figure 4:
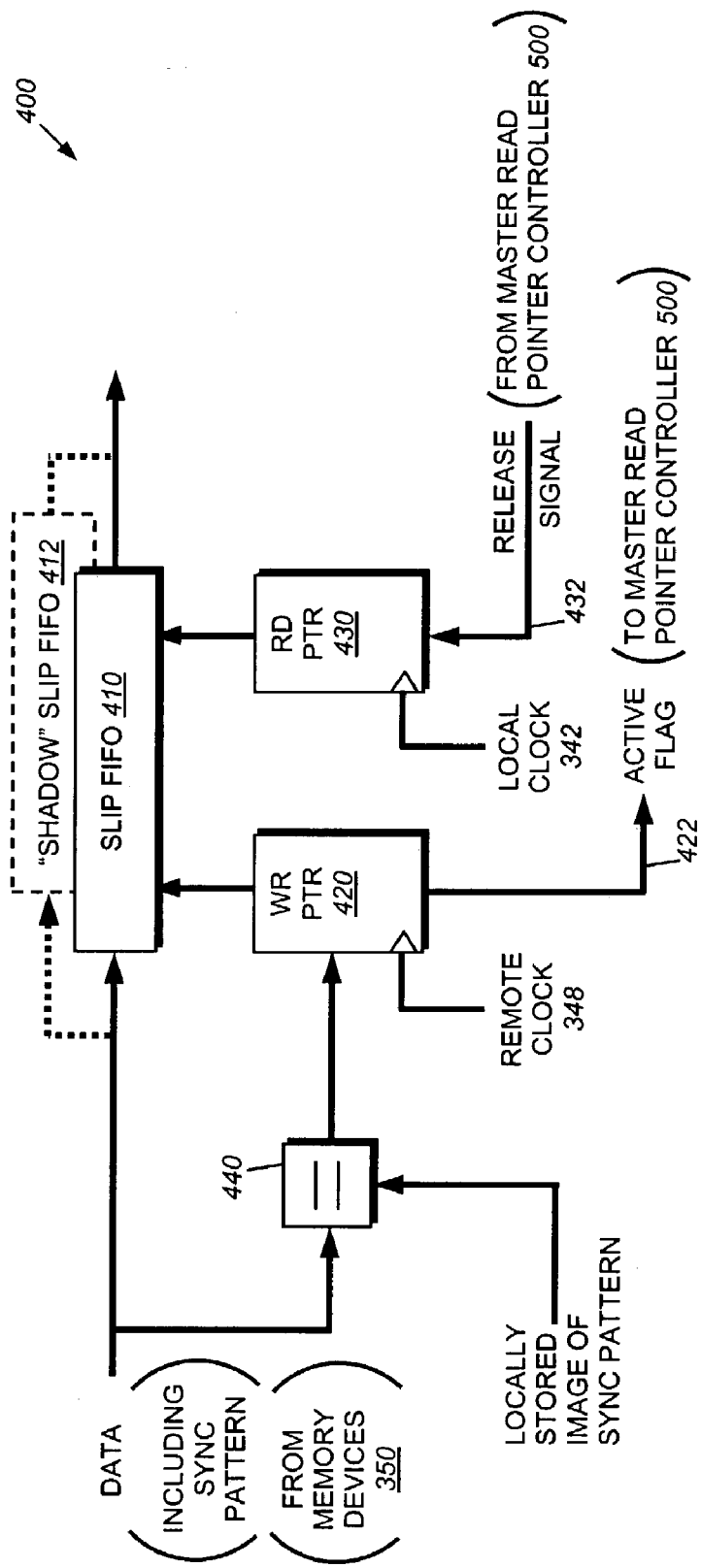
FIG. 4 is a schematic block diagram of a synchronization logic circuit of the present invention.

FIG. 4 is a schematic block diagram of the synchronization logic 400 of the present invention. A synchronization logic circuit 400 is provided at the memory controller 340 for each data grouping 365 on each memory device 350. Each synchronization logic circuit 400 comprises a "slip" first in first out (FIFO) queue 410, a comparator 440 configured to recognize the sync pattern, a write pointer (wr ptr) 420 of the FIFO running in the remote clock domain 346 of the subsystem 300 and a read pointer (rd ptr) 430 of the FIFO operating in the local clock domain 344. The synchronization logic 400 is located at the local clock boundary 380 in the memory controller 340 and the slip FIFO 410 "traverses" that local clock boundary. The term "slip" FIFO thus denotes a FIFO queue that is placed at an asynchronous boundary, such as local clock boundary 380. In this context, the write pointer 420 of the slip FIFO is controlled by the remote clock signals 348 running in the remote clock domain 346, while the read pointer 430 of the FIFO is controlled by the local clock signals 342 running in the local clock domain 344.

In the illustrative embodiment, each slip FIFO 410 is a storage device having N entries. Any number of N entries can be chosen to accommodate as much skew as needed within the FIFO. Note that each entry is wide enough to accommodate the particular data grouping, e.g., 8 bits wide. For example, if the memory subsystem 330 is running at a 400 MHz clock rate, eight entries within each slip FIFO can accommodate up to 10 nsecs of skew, wherein each entry can handle 1.25 nsecs of skew. For a memory subsystem operating at higher (e.g., gigahertz) clock rates, an 8-entry slip FIFO can accommodate up to 4 nsecs of skew. By increasing the number of entries within the slip FIFO, the present invention can accommodate even greater amounts of delays/skews in the memory subsystem 330.

When powering up the memory subsystem and, in particular, the synchronization logic circuit 400, the write and read pointers of the slip FIFO 410 are initialized to location zero. Prior to writing the known sync pattern from the memory controller 340 to the memory devices 350, the memory devices are initialized with proper configuration settings, such as burst length and read and write latencies. This ensures that the clock, address and data signals transferred from the memory controller match the configured memory device timing settings. Since the write operations are directed to individual memory devices, the only concern is with the configuration settings (timing) within each memory device. The memory controller 340 then writes the known sync pattern to each of the memory devices 350 and, more specifically, to each of the data groupings 365 within each of the devices.

After the sync pattern has been written to the data groupings 365 of memory devices 350, that pattern is retrieved (read) from the devices and stored in the synchronization logic 400 of the memory controller 340 to synchronize all of the memory devices 350 before any operations are performed to those memory devices. That is, all data retrieved from all memory devices (and all data groupings 365 from those devices) are synchronized in the local clock domain 344 at the same clock cycle. Because the known sync pattern and subsequent data retrieved from the memory devices arrive at the memory controller with substantial skew that scatters that data over many clock cycles, the memory controller 340 synchronizes the data to the local clock domain at the same clock cycle using the synchronization logic 400.

Specifically, the sync pattern retrieved from the memory devices is loaded into the slip FIFO(s) and provided to the comparator 440, which compares the received pattern with a locally stored image of the sync pattern. The comparator 440 holds the write pointer 420 at location zero until it recognizes the sync pattern. When the received sync pattern matches the locally stored sync pattern, the comparator 440 releases the write pointer 420 so that it may begin incrementing (by one) in a "free running" manner in response to subsequently received data. In other words, on every rising and falling edge of is the remote clock signal 348, the write pointer 420 increments its referenced location within the slip FIFO. Alternatively, if the write pointer 420 is configured to increment only on the rising edge of the clock signal, then two slip FIFOs are needed. Here, a first slip FIFO 410 captures data on the rising edge of the clock signal 348 and a second "shadow" slip FIFO 412 captures data on the falling edge of the signal 348.

When the sync pattern has been fully received at each slip FIFO, thereby allowing the write pointer 420 of the FIFO to run freely, the write pointer generates an active flag 422. Although the write pointer 420 is free running, the read pointer 430 is still held at location zero in the local clock domain 344. This is to ensure synchronization of retrieved data among all memory devices 350 of the memory subsystem 300. Once all active flags 422 are received by a master read pointer controller 500, the controller sends out a release signal 432 that forces each read pointer 430 of each slip FIFO to increment at the same time. Therefore, data is retrieved from each slip FIFO across the entire the 256-bit data bus in a manner that synchronizes that data at the memory controller 340 at the same local clock cycle at the local clock boundary 380.

Figure 5:
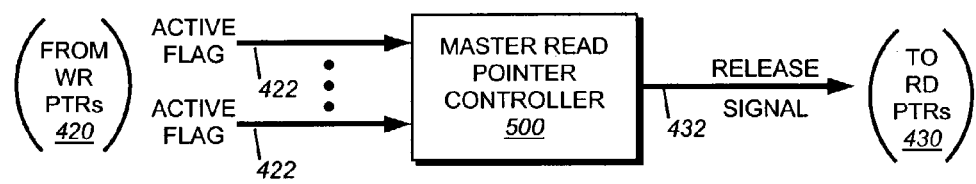
FIG. 5 is a schematic block diagram of a master read pointer controller that may be advantageously used with the synchronization logic circuit of the present invention.

FIG. 5 is a schematic block diagram of the master read pointer controller 500 that may be advantageously used with the present invention. The master read pointer controller 500 operates in the local clock domain 344 and comprises conventional logic configured to monitor the assertion of the active flags 422. To that end, the master read pointer controller 500 cooperates with the synchronization logic circuits 400 to receive all active flags 422 of all write pointers 420 associated with all slip FIFOs. Once the active flags are asserted, they remain asserted and function as DC state signals; therefore there is no problem with those asserted flags crossing an asynchronous clock boundary (such as boundary 380). According to an aspect of the inventive technique, the read pointers 430 of all slip FIFOs are not released until all write pointers 420 assert their active flags 422. That is once all of the active flags are asserted, the master read pointer controller 500 releases all of the read pointers 430 at the same time by generating, e.g., a release signal 432 that is broadcast from the controller 500 to all read pointers 430. This allows all of the read pointers to become free running.

Once initialized, the read and write pointers should not have to be reset because both the remote and local clocks have the same frequency. However, phase shifts occur among the clock signals due to skew in the memory subsystem. The present invention solves this phase shift problem by aligning all read pointers 430 at their slip FIFOs of the synchronization logic 400. The locations of the write pointers 420 may vary among the slip FIFOs; this is expected and enables the "consumption" of skew in the memory subsystem. It should be noted that the amount of skew that the system can tolerate together with the frequency at which the memory subsystem operates must be determined beforehand in order to arrive at a proper number of entries for each of the slip FIFOs.

Figure 6:
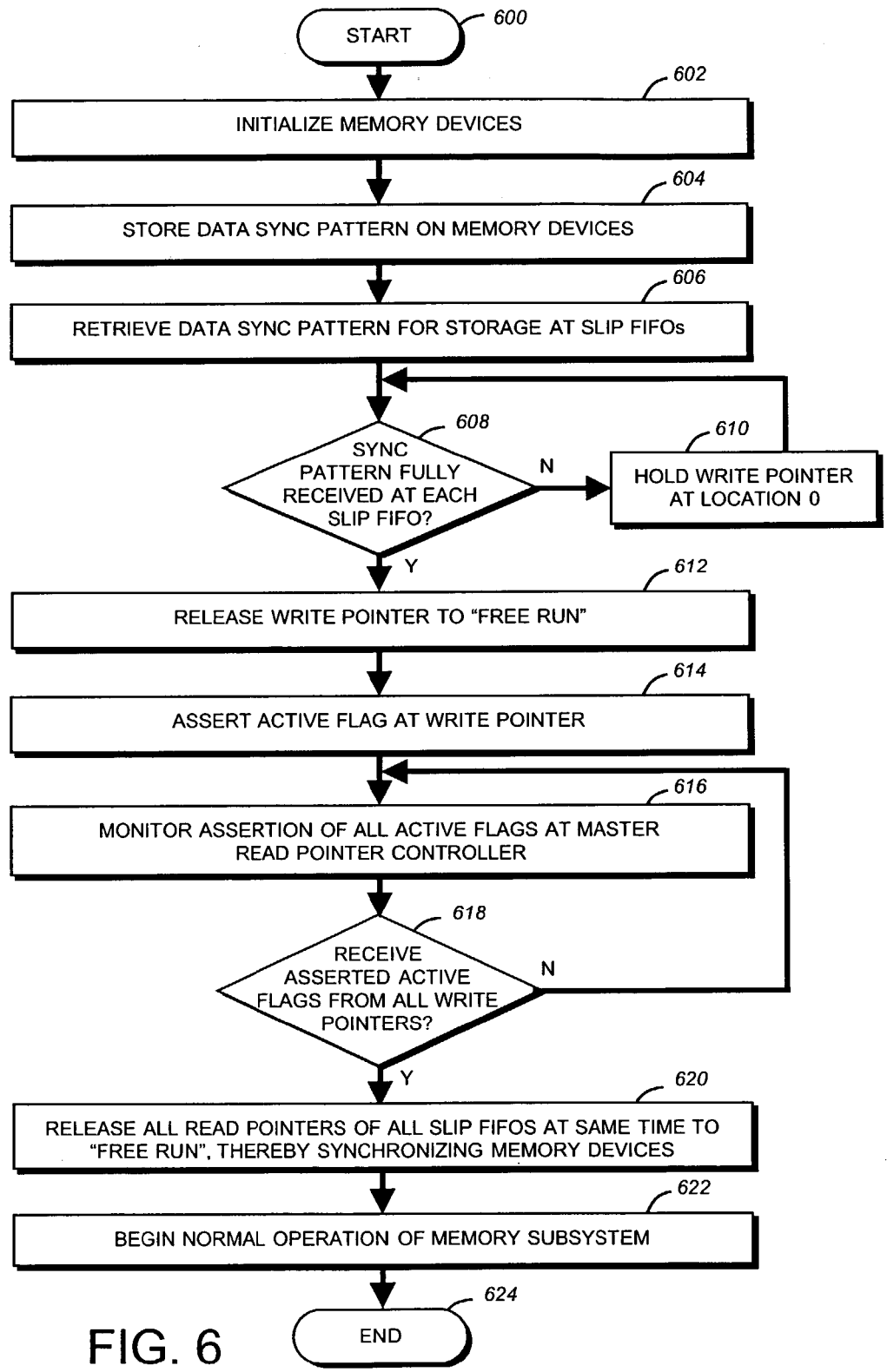
FIG. 6 is a flow chart illustrating a sequence of steps used to implement a synchronization technique according to the present invention.

FIG. 6 is a flow chart illustrating a sequence of steps used to implement the synchronization technique according to the present invention. The sequence starts at Step 600 and proceeds to Step 602 where the memory devices are initialized with proper configuration settings, such as burst length and read and write latencies. Before normal operation, the memory controller issues write operations to store a known 256-bit data pattern across all the memory devices (Step 604). During the write operations only individual data grouping is of concern since the memory devices handle all data transfers at the data grouping level.

At Step 606, the memory controller issues read operations to the memory devices to retrieve the known data pattern; the memory controller treats the data pattern as a sync pattern word. As noted, synchronization logic on the memory controller includes a dedicated slip FIFO for each data grouping and the retrieved sync pattern is stored at each slip FIFO. At Step 608, a determination is made as to whether the sync pattern word has been fully received at each slip FIFO associated with each data grouping. If not, the write pointer of the slip FIFO is held at location zero in Step 610 and the sequence returns to Step 608. However, if the sync pattern word is fully received at the slip FIFO, the write pointer is released and becomes free running (Step 612). The write pointer then asserts an active flag (Step 614) that is received by the master read pointer controller.

At Step 616, the master read pointer controller monitors the assertion of all active flags from all write pointers of the slip FIFOs. At Step 618, a determination is made as to whether the master read pointer controller has received asserted active flags from all of the write pointers. If not, the sequence returns to Step 616 where the master read pointer controller continues to monitor the assertion of the active flags. Once the master controller receives asserted active flags from all write pointers, it releases all read pointers of all slip FIFOs at the same time so that they become free running (Step 620). This synchronizes the entire 256-bit data word in the local clock domain on the same local clock cycle, thereby effectively synchronizing operation of all memory devices in the subsystem. Normal operation of the memory subsystem can then begin in Step 622 and the sequence ends at Step 624.

Figure 7:
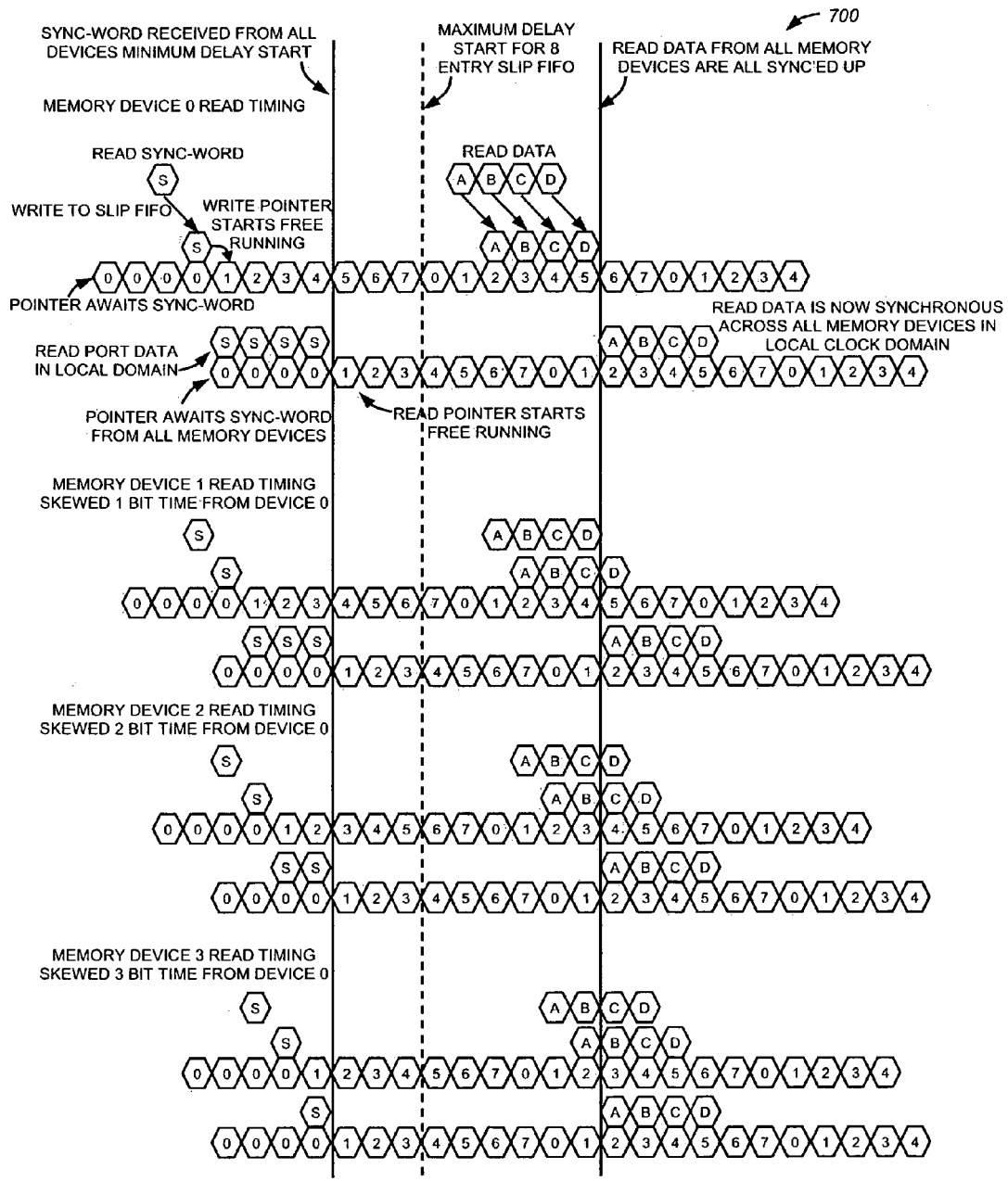
FIG. 7 is a timing diagram illustrating operation of the synchronization logic according to the present invention.

FIG. 7 is a timing diagram 700 illustrating the operation of the synchronization logic according to the present invention. The timing diagram illustrates when the write pointers 420 for the slip FIFOs of the memory devices 350 (memory devices 0-3) become free running, while illustrating that the read pointers 430 are held at locations zero of their slip FIFOs until all sync patterns have been fully received at the FIFOs. The diagram further illustrates how all the read pointers 430 are released at the same time to thereby synchronize read data from all memory devices 350 at the local clock boundary 380 of the memory controller 340. In addition, the diagram illustrates the relative positions of the write pointers 420 and the maximum delay point of an 8-entry slip FIFO 410 for starting the read pointer 430 in a free running manner so as to avoid a "wrap-around" condition in the FIFO that overwrites previously stored data.

The synchronization technique described herein can tolerate any number cycles of skew in the read data arrival time, depending on the depth of the slip FIFO 410. For example, if there are 16 entries in the slip FIFO then the system can tolerate up to 16 cycles of skew between data grouping arrivals. If the total skew is 3 nsecs, the novel technique allows the memory subsystem to operate at a speed of 3 nsecs divided by 16 or up to 5.33 GHz (data bus speed), while ensuring that data capture within each individual grouping can still be properly performed. Advantageously, the novel technique does not require additional interface signals to indicate when data is valid at the memory controller. The synchronization technique enables the memory bus to be substantially wide and tolerate skewed data for many data groups that can span multiple clock cycles.

While there has been shown and described an illustrative embodiment for synchronizing data from memory devices of a high-speed memory subsystem, it is to be understood that various other adaptations and modifications may be made within the spirit and scope of the present invention. For example, instead of using active flags, the read pointers may alternatively be released using the actual sync pattern as a triggering mechanism. Note that each individual write pointer starts free running once the sync pattern for that data group is received at location zero of its slip FIFO. Each read pointer is held at location zero until all read pointers are synchronized. Therefore, the first data retrieved by the read pointer is the sync pattern at location zero. In accordance with this alternative embodiment, the master read pointer controller can alternatively monitor the reception of the sync word at location zero of each slip FIFO before it releases all of the read pointers at the same time. This embodiment may be more costly because of the need to replicate the sync word comparators at the master read pointer controller.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for synchronizing data retrieved from memory devices of a memory subsystem in an intermediate network node, each memory device organized into a plurality of data groupings, the method comprising the steps of:
    writing, by a memory controller, data including a synchronization (sync) pattern over a memory bus to each data grouping on the memory devices, the memory bus directly connecting the memory controller to the memory devices;
    providing synchronization logic at the memory controller for each data grouping;
    retrieving the sync pattern over the memory bus from each data grouping for storage at an associated synchronization logic of the memory controller;
    comparing the retrieved sync pattern at the synchronization logic with a local sync pattern stored in a comparator within the synchronization logic; and
    automatically, in response to the retrieved sync pattern and the local sync pattern matching, synchronizing data retrieved from the data groupings on the memory devices each time the data is retrieved from the data groupings, to compensate for skew between data retrieved from different data groupings.

2. The method of claim 1 wherein the synchronization logic for each data grouping comprises a slip first in first out (FIFO) queue, a write pointer, and a read pointer.

3. The method of claim 2 wherein the step of comparing comprises the steps of:
    holding the write pointer at location zero of the slip FIFO queue; and
    in response to the retrieved sync pattern matching the local sync pattern, releasing the write pointer so that it begin incrementing in a free running manner.

4. The method of claim 3 further comprising the steps of:
in response to the write pointer incrementing in the free running manner, generating an asserted active flag at the write pointer; and
receiving the asserted active flag from the write pointer of the synchronization logic provided for each data grouping at a master read pointer controller of the memory controller.

5. The method of claim 4 further comprising the step of, in response to receiving the asserted active flag from the write pointer of the synchronization logic provided for each data grouping, releasing the read pointer of the synchronization logic provided for each data grouping.

6. The method of claim 1 wherein the step of writing further comprises the step of:
initializing each data grouping on the memory devices with configuration settings.

7. The method of claim 6 wherein the configuration settings include burst length, read latency, and write latency.

8. A system adapted to synchronize data within a memory subsystem of an intermediate network node, the system comprising:
a plurality of memory devices, each memory device organized into a plurality of data groupings;
a memory controller directly connected to the memory devices by a memory bus, the memory controller configured to write data including a synchronization (sync) pattern over the memory bus to each data grouping on each memory device, and then to retrieve the sync pattern over the memory bus from each data grouping on each memory device;
a comparator configured to compare the retrieved sync pattern with a local sync pattern stored on the comparator to determine if the sync pattern and the local sync pattern match; and
synchronization logic circuits of the memory controller, each synchronization logic circuit associated with a data grouping and configured to automatically synchronize data retrieved from the data groupings in response to matching the retrieved sync pattern to the local sync pattern, to compensate for skew between data retrieved from different data groupings.

9. The system of claim 8 wherein each synchronization logic circuit comprises a slip first in first out (FIFO) queue adapted to store the data, including the sync pattern, retrieved from each data grouping.

10. The system of claim 8 wherein the synchronization logic further comprises a write pointer adapted to increment in a free running manner in response to the retrieved sync pattern matching the local sync pattern.

11. The system of claim 10 wherein the write pointer is further configured to generate an asserted active flag in response to incrementing in the free running manner.

12. The system of claim 11 further comprising a master read pointer controller configured to receive the asserted active flag from the write pointer of each synchronization logic circuit and, in response to receiving asserted active flags from all write pointers of all synchronization logic circuits, generate a release signal.

13. The system of claim 12 wherein the synchronization logic circuit further comprises a read pointer adapted to increment in a free running manner in response to the master read pointer controller broadcasting the release signal to the read pointers of all synchronization logic circuits at the same time.

14. The system of claim 13 wherein the intermediate network node is a router.

15. The system of claim 8 wherein the intermediate network node is a switch.

16. Apparatus for synchronizing data retrieved from memory devices at a memory controller of a memory subsystem, each memory device organized into a plurality of data groupings, the apparatus comprising:
means for writing, by the memory controller, data including a synchronization (sync) pattern over a memory bus to each data grouping on the memory devices, the memory bus directly connecting the memory controller to the memory devices;
means for associating synchronization logic at the memory controller with each data grouping;
means for retrieving the sync pattern over the memory bus from each data grouping for storage at an associated synchronization logic of the memory controller;
means for comparing the retrieved sync pattern at the synchronization logic with a local sync pattern stored in a comparator within the synchronization logic; and
means for automatically, in response to the retrieved sync pattern and the local sync pattern matching, synchronizing data retrieved from the data groupings on the memory devices each time the data is retrieved from the data groupings, to compensate for skew between data retrieved from different data groupings.

17. The apparatus of claim 16 wherein the means for comparing comprises:
means for holding a write pointer of the synchronization logic at location zero of a slip first in first out (FIFO) queue; and
means for releasing the write pointer so that it begin incrementing in a free running manner, in response to the retrieved sync pattern matching the local sync pattern.

18. The apparatus of claim 17 further comprising:
means for generating an asserted active flag at the write pointer, in response to the write pointer incrementing in the free running manner; and
means for receiving the asserted active flag from the write pointer of the synchronization logic associated with each data grouping at a master read pointer controller of the memory controller.

19. The apparatus of claim 18 further comprising:
means for releasing a read pointer of the synchronization logic associated with each data grouping, in response to the means for receiving the asserted active flag from the write pointer of the synchronization logic associated with each data grouping.

20. A method for synchronizing data retrieved from memory devices at a memory controller of a memory subsystem, each memory device organized into a plurality of data groupings, the method comprising the steps of:
providing a plurality of synchronization logic circuits at the memory controller, each synchronization logic circuit associated with a data grouping, each synchronization logic circuit comprising a slip first in first out (FIFO) queue, a write pointer, a read pointer and a comparator;
writing a synchronization (sync) pattern over a memory bus to each data grouping for storage in each data grouping the memory bus directly connecting the memory controller to the memory devices;
retrieving the sync pattern over the memory bus from the data groupings for storage at the slip FIFO queues of the synchronization logic circuits;
comparing the retrieved sync pattern with images of the sync pattern locally stored at the comparators of the synchronization logic circuits and, in response to the retrieved sync pattern matching the locally stored image of the sync pattern, releasing the write pointer from location zero of the slip FIFO at each synchronization logic circuit so that the write pointer begin incrementing in a free running manner;

generating an asserted active flag in response to each write pointer incrementing in the free running manner;

receiving the asserted active flag from each write pointer of each synchronization logic circuit at a master read pointer controller of the memory controller; and releasing the read pointers of the synchronization logic circuits at the same time upon the reception of the asserted active flags from all write pointers of the synchronization logic circuits, to compensate for skew between data retrieved from different data groupings.

21. A computer readable medium containing executable program instructions for synchronizing data retrieved from memory devices at a memory controller of a memory subsystem, each memory device organized into a plurality of data groupings, the executable program instructions comprising program instructions for:

writing, by a memory controller, data including a synchronization (sync) pattern over a memory bus to each data grouping on the memory devices, the memory bus directly connecting the memory controller to the memory devices;

retrieving the sync pattern over a memory bus from each data grouping for storage at synchronization logic of the memory controller associated with each data grouping;

comparing the retrieved sync pattern at the synchronization logic with a local sync pattern stored in a comparator within the synchronization logic; and automatically, in response to the retrieved sync pattern and the local sync pattern matching, synchronizing data retrieved from the data groupings on the memory devices each time the data is retrieved from the data groupings to compensate for skew between data retrieved from different data groupings.

22. The computer readable medium of claim 21 wherein the program instruction for comparing comprises program instructions for:

holding a write pointer of the synchronization logic at location zero of a slip first in first out (FIFO) queue; and in response to the retrieved sync pattern matching the local sync pattern, releasing the write pointer so that it begin incrementing in a free running manner.

23. The computer readable medium of claim 22 further comprising program instructions for:

in response to the write pointer incrementing in the free running manner, generating an asserted active flag at the write pointer; and receiving the asserted active flag from the write pointer of the synchronization logic associated with each data grouping at a master read pointer controller of the memory controller.

24. The computer readable medium of claim 23 further comprising one or more program instructions for, in response to receiving the asserted active flag from the write pointer of the synchronization logic associated with each data grouping, releasing a read pointer of the synchronization logic associated with each data grouping.

25. A system adapted to synchronize data from a memory subsystem of an intermediate network node, the system comprising:

a plurality of memory devices, each memory device organized into a plurality of data groupings;

a memory controller directly connected to the memory devices by a memory bus, the memory controller configured to write data including a synchronization (sync) pattern to each data grouping over the memory bus, and to retrieve the sync patterns from each data grouping over the memory;

a plurality of synchronization logic circuits in the memory controller, each synchronization logic circuit associated with one of the data groupings, each synchronization logic circuit including a first in first out (FIFO) queue, a write pointer, a read pointer and a comparator, each comparator configured to, upon retrieval of a sync pattern from the associated data grouping, compare the retrieved sync pattern with a locally stored image of the sync pattern and, in response to the retrieved sync pattern matching the locally stored image of the sync pattern, trigger the write pointer of the FIFO to increment in response to clock cycles; and a master read pointer controller configured to trigger the read pointers of all the synchronization logic circuits to increment in response to clock cycles, when all write pointers have begun incrementing, to synchronize data received from data groupings to the same clock cycle to compensate for skew between data retrieved from different data groupings.

26. The system of claim 25 wherein each write pointer is further configured to generate an asserted active flag in response to being triggered to increment in response to clock cycles.

27. The system of claim 26 wherein the master read pointer controller is further configured to receive the asserted active flags from the write pointers of each synchronization logic circuit and, in response to receiving asserted active flags from all the write pointers, generate a release signal to the read pointers.

28. The system of claim 25 wherein the FIFO queue is a slip FIFO queue.

29. The system of claim 25 wherein the write pointer of each synchronization logic increments starting from a zero location of the FIFO queue.

* * * * *

UNITED STATES PATENT AND TRADEMARK OFFICE
CERTIFICATE OF CORRECTION

| | | |
|---|---|---|
| PATENT NO. | : 7,469,328 B1 | Page 1 of 1 |
| APPLICATION NO. | : 10/359985 | |
| DATED | : December 23, 2008 | |
| INVENTOR(S) | : Mak | |

It is certified that error appears in the above-identified patent and that said Letters Patent is hereby corrected as shown below:

Col. 8, Line 14, please amend as shown:

of[[is]] the remote clock signal 348, the write pointer 420 incre-

Signed and Sealed this
Eighteenth Day of January, 2011

David J. Kappos
*Director of the United States Patent and Trademark Office*